United States Patent [19]

Peled

[11] 4,224,389
[45] Sep. 23, 1980

[54] NON-AQUEOUS PRIMARY CELL

[75] Inventor: Emanuel Peled, Givatayim, Israel

[73] Assignee: Ramot University Authority for Applied Research and Industrial Development Ltd., Tel-Aviv, Israel

[21] Appl. No.: 925,564

[22] Filed: Jul. 17, 1978

[30] Foreign Application Priority Data

Jul. 21, 1977 [IL] Israel .................................. 52570

[51] Int. Cl.$^3$ .............................................. H01M 6/16
[52] U.S. Cl. .................................... 429/194; 429/199; 429/213
[58] Field of Search ............... 429/213, 212, 105, 101, 429/194, 191, 199, 198, 218

[56] References Cited

U.S. PATENT DOCUMENTS

| | | | |
|---|---|---|---|
| 3,514,337 | 5/1970 | Braeuer et al. | 429/194 |
| 3,547,703 | 12/1970 | Blomgren et al. | 429/198 X |
| 3,573,105 | 3/1971 | Weininger et al. | 429/105 |
| 4,012,564 | 3/1977 | Auborn | 429/194 |
| 4,060,674 | 11/1977 | Klemann | 429/194 |

*Primary Examiner*—Anthony Skapars
*Attorney, Agent, or Firm*—Browdy and Neimark

[57] ABSTRACT

A primary electric cell comprising, in combination:

(a) an anode consisting essentially of a metal selected from alkali metal, calcium and magnesium, and alloys of two or more of said metals which alloys are solid at temperatures up to 75° C.;

(b) a liquid solution having a conductivity of at least 1 mMho.cm$^{-1}$ and comprising:

(i) a non-aqueous cathode consisting of an aprotic, reducible organic compound capable, under the conditions prevailing in the cell, of rapidly reacting with the metal of said anode, so as to form on the surface thereof a thin, compact, insoluble layer of solid electrolyte having $t_{e^-} = 0$ and $t_{M^+}$ substantially equal to 1; and (ii) an electrolyte being a salt of the cation of the metal of said anode and a large complex anion; and (c) an inert, porous cathodic collector consisting of carbon or graphite or of compressed carbon or graphite powder optionally with a suitable binder.

11 Claims, No Drawings

NON-AQUEOUS PRIMARY CELL

This invention concerns a primary electric cell comprising a liquid cathode and having a high energy density, of the so-called "non-aqueous battery" type.

For more than one decade a great amount of research has been directed towards the development of high energy density, non-aqueous battery systems and most of this research has been concentrated around primary organic electrolyte batteries employing lithium as the anode material. A wide variety of inorganic and organic solvents have been screened as possible liquid cathodes and/or as solvents in combination with a host of various electrolytes. However, most of these experiments apparently did not yield practically feasible solutions to the problems, as evidenced by the fact that only two battery systems of this type have become commercially available—namely the lithium-thionyl chloride cell and the lithium-sulphur dioxide cell. By virtue of their high energy density these cells are adapted to specific uses where high energy output to weight ratios are essential, e.g. in mobile communication equipment, in implanted heart pacers and the like. These two commercial battery systems, however, involve considerable drawbacks and hazards, owing to the high corrosiveness and toxicity of the thionyl chloride and sulphur dioxide and owing to the necessity to employ the sulphur dioxide under superatmospheric pressures in hermetically sealed containers.

It is an object of the present invention to overcome the abovementioned drawbacks and hazards of the hitherto available non-aqueous lithium batteries. This object has been achieved in accordance with the present invention by the surprising and unexpected finding that the range of the liquid cathodes suitable for use in non-aqueous primary electric cells, with lithium or similar anodes, can be extended to include a variety of aprotic, reducible organic compounds which are free of the un-desirable properties exhibited by thionyl chloride and sulphur dioxide.

The present invention thus provides a primary electric cell comprising, in combination:
(a) an anode consisting essentially of a metal selected from alkali metals, calcium and magnesium and alloys of two or more of said metals which alloys are solid at temperatures up to 75° C.;
(b) a liquid solution having a conductivity of at least 1 mMho.cm$^{-1}$ and comprising:
  (i) a non-aqueous cathode consisting of an aprotic, reducible organic compound capable, under the conditions prevailing in the cell, of rapidly reacting with the metal of said anode, so as to form on the surface thereof a thin, compact, insoluble layer of solid electrolyte (hereinafter "solid electrolyte interphase") having $t_e- = 0$ and $t_M+$ substantially equal to 1; and
  (ii) an electrolyte being a salt of the cation of the metal of said anode and a large complex anion; and
(c) an inert, porous cathodic collector consisting of carbon or graphite or of compressed carbon or graphite powder optionally with a suitable binder.

In the above, $t_e-$ and $t_M+$ designate the transference (or transport) numbers of the electrons and the metal cations, respectively.

Several authors have already observed the formation of, so-called, "passivating layers" of insoluble reaction products on the surface of lithium metal electrodes upon contact with inorganic oxyhalides (such as $POCl_3$, $SOCl_2$ and $SO_2Cl_2$) as well as organic solvents (such as propylene carbonate and dimethyl sulphite). In some cases the chemical constitution of these layers was established (cf., e.g., A. N. Dey, Electrochimica Acta 1976, Vol. 21 pp. 377–382). However, these "passivating layers" were regarded by some researchers as an undesirable phenomenon, responsible, inter alia, for voltage-delays. There have even been suggested means for removing these insoluble passivating layers.

It has now been found in accordance with the present invention, that in certain suitably selected systems, a rapid chemical reaction takes place between the metal anode and the liquid cathode immediately upon the establishment of contact therebetween. This reaction involves the reduction of the liquid cathode by the anode causing formation, within fractions of a second, of a thin (1.5 m$\mu$ or more), solid electrolyte layer on the surface of the anode. This layer is a good insulator for electrons ($t_e- = 0$) but is selectively permeable to the cations of the metal of the anode, (i.e. $t_M+ = 1$; $t_x- = 0$). The layer is referred to herein also as "solid electrolyte interphase".

The invention is based on the realization that a non-aqueous battery system of the kind defined above can function in the desired manner only if such a solid electrolyte interphase is formed and only if this solid electrolyte interphase exhibits the required properties, i.e. does not conduct electrons and is selectively permeable to the cation of the metal of the anode. The solid electrolyte interphase should further be compact and insoluble in the liquid solution comprising the non-aqueous cathode.

Among the compounds of alkali metals, calcium and magnesium, a number are known to have the solid electrolyte properties defined above for the solid electrolyte interphase. As examples the alkali metal halides, sulphides and oxides may be mentioned. Accordingly, the organic compounds suitable for use as liquid cathodes in combination with alkali metal anodes can be selected from aprotic organic compounds capable of being reduced by reaction with the alkali metal so as to form, e.g., alkali metal halides, oxides or sulphides. Suitable organic compounds for use as non-aqueous cathodes in the cells according to the invention this include: halogenated hydrocarbons, preferably having not more than one halogen atom on each carbon atom (such as 1,2-dichloroethane, 1,2-dribromoethane and 1,2-difluoropropane); organic sulphur compounds (such as sulphides, disulphides, sulphites, sulphoxides, sulphones, etc.); and organic nitrogen compounds containing nitrogen atoms linked to oxygen atoms (such as nitroso compounds, nitro compounds, nitrites, nitrates, nitroxides, etc.). The aforementioned compounds were named by way of examples only and the list given above should not be taken as exhaustive. It should be understood that any aprotic reducible organic compound capable of forming the aforesaid solid electrolyte interphase layer can be used for the construction of primary cells according to the invention.

The organic compounds for use as cathodes in accordance with the invention, are preferably liquid at room temperature. However, solid organic compounds can also be used as cathodes when dissolved in a suitable organic aprotic solvent. Such solvents should be chemically inert to the anode, to the organic cathode and to the electrolyte (or electrolytes) dissolved therein. The solvents should further be liquid at temperatures between about −50° and 100° C. Suitable solvents include esters, such as methyl acetate; cyclic esters, such as propylene carbonate; amides, such as dimethylformamide; ethers, such as tetrahydrofuran; hydrocarbons, e.g. toluene; and acetonitrile.

A solvent of the type described above is also required in cases where the organic cathode is not capable of dissolving the electrolyte (or electrolytes) to an extent sufficient to provide for the required conductivity of at least 1 mMho.cm$^{-1}$.

The liquid solution comprising the organic cathode must contain at least one electrolyte selected from salts of the anode metal with a suitable anion. This anion should be a large complex anion, such as $ClO_4^-$, $BF_4^-$, $PF_6^-$, $AlCl_4^-$, $BCl_4^-$, $S_8^{--}$. These anions do not tend to form ion pairs with the metal cation, thus contributing to a higher degree of dissociation with a consequent higher conductivity of the liquid solution. Furthermore, it has been found that such large complex anions are incapable of penetrating the solid electrolyte interphase, in compliance with the requirements that the transference number in respect of anions should be zero ($t_x - = 0$).

In addition to the aforedescribed electrolyte, the liquid solution comprising the organic cathode may optionally contain one or more additional electrolytes selected from salts of alkali metals and alkaline earth metals, provided that the EMF of such metals should not be lower than the EMF of the anode metal by more than 0.5 volts. The purpose of adding these additional electrolytes is, inter alia, to increase the conductivity of the liquid solution and/or to increase the solubility of the first electrolyte, namely the salt of the anode metal with the complex anion. Furthermore, it has been found that in certain cases the addition, as an additional electrolyte, of a salt of a cation having a higher valence than the cation of the metal of the anode, results in a desirable "doping" of the solid electrolyte interphase, thereby increasing its transference number in respect of cations $t_M+$ to values approaching or equal to 1. A similar result, i.e. beneficial "doping" of the solid electrolyte interphase, can be achieved by using an anode consisting of an alloy of an alkali metal with calcium or magnesium.

The anodes used in the cells according to the invention may be of the same type as those used in the known non-aqueous battery system. Lithium is a preferred metal for the anode, and can be used either in the form of lithium ribbon without support or rolled onto metal grids, e.g. of copper or stainless steel, which serve as current collectors. Because of the comparatively low conductivity of the organic electrolyte solution, the anodes should preferably be designed so as to possess high surface areas.

Where an alkali metal is used for the anode, it may possibly be alloyed with another alkali metal or with up to 15% of its weight of calcium or magnesium, both in order to improve the mechanical properties of the anode and/or to provide for the aforementioned "doping" of the solid electrolyte interphase in order to increase its selectivity in favour of the cations of the anode metal.

The cathodic collector used in the primary cells according to the invention, is also of a known type, sometimes referred to as "non-reactive cathode". The cathodic collector should be inert to the electrolyte solution, should be a good conductor for electrons and should possess a maximum surface area in order to avoid, or reduce blockage of the cathodic collector by insoluble reaction products deposited thereon. Porous cathodic collectors of carbon or graphite fulfil these requirements. Alternatively, the cathodic collector may consist of compacted carbon powder or graphite powder held together by means of a suitable binder.

The invention is illustrated by the following non-limiting Examples:

EXAMPLE 1

C-size cylindrical cells were constructed from a stainless steel can, closed by a stainless steel lid and sealed by means of a teflon gasket. Each cell comprised a central cylindrical cathodic collector having a diameter of 20 mm and a length of 40 mm, made of porous carbon (conventionally used carbon powder compacted with a teflon binder), a non-woven glass fabric separator surrounding the cathodic collector and an anode of lithium foil rolled onto the inner wall of the can. The thickness of the lithium foil anode was about 1 mm and its surface area about 25 cm. The cell comprised, as a liquid cathode, about 13–14 ml of propylene glycol-1,2-sulphite containing lithium-perchlorate, at a 1 M concentration.

The open circuit voltage (OCV) of the cell was 2.7–2.8 volts and the working voltage across a 100Ω resistor was about 2.2 volts. After 80 hours of discharge this working voltage dropped to about 1.6 volts.

EXAMPLE 2

Cells were constructed as in Example 1, except that the liquid cathode was Freon F113 dissolved in three times its volume of γ-butyrolactone. The solution contained 0.5 M LiBF$_4$ and was saturated with lithium chloride.

The OCV of the cell was 2.8–3.0 volts and the working voltage across a 200Ω resistor was about 2.5 volts and dropped after 190 hours of discharge to about 0.8 volts.

EXAMPLE 3

Cells were constructed as in Example 1, except that the liquid cathode was 1,1,1-trichloroethane dissolved in twice its volume of γ-butyrolactone. The solution included 0.5 M lithium perchlorate and was saturated with lithium chloride.

The OCV of the cell was 2.9–3.1 volts and the working voltage across a 100Ω resistor was 2.3 volts. After 60 hours of discharge this working voltage dropped to 1.5 volts.

EXAMPLE 4

Cells were constructed as in Example 1, except that the liquid cathode was propylene glycol-1,2-sulphite containing 1M LiBF$_4$.

The OCV of the cells was 2.8–3.0 volts and the working voltage across a 100Ω resistor was 2.5 volts, dropping after 50 hours of discharge to 1.5 volts.

EXAMPLE 5

Cells were constructed as in Example 1, except that the liquid cathode was 1,2-dichloroethane dissolved in twice its volume of tetrahydrofuran. The solution was saturated with lithium chloride.

The OCV of the cells was 2.6–2.8 volts and the working voltage across a 200Ω resistor was 2.2, this value remaining unchanged after 60 hours of discharge.

EXAMPLE 6

Cells were constructed as in Example 1, except that the liquid cathode was 1,2-dibromoethane admixed with tetrahydrofuran in 3:1 proportions by volume. The solution contained 0.1 M LiBF$_4$ and was saturated with lithium bromide.

The OCV of the cells was 2.6–2.8 volts and the working voltage across a 3000Ω resistor was 2.2 volts, dropping after 280 hours of discharge to 1.7 volts.

I claim:

1. A primary electric cell comprising, in combination:
 (a) an anode consisting essentially of a metal selected from alkali metal, calcium and magnesium, and alloys of two or more of said metals which alloys are solid at temperatures up to 75° C.;
 (b) a liquid solution having a conductivity of at least 1 mMho.cm$^{-1}$ and comprising:
  (i) a non-aqueous cathode consisting of an aprotic, reducible organic compound capable, under the conditions prevailing in the cell, of rapidly reacting with the metal of said anode, so as to form on the surface thereof of a thin, compact insoluble layer of solid electrolyte having $t_e-=0$ and $t_M+$ substantially equal to 1, said aprotic cathode being selected from the group consisting of Freon F 113; 1,1,1-trichloroethane; 1,2-dichloroethane; 1,2-difluoropropane; 1,2-dibromoethane and propylene glycol-1,2-sulfite; and
  (ii) an electrolyte being a salt of the cation of the metal of said anode and a large complex anion selected from the group consisting of $ClO_4^-$, $BF_4^-$, $PF_6^-$, $AlCl_4^-$, $BCl_4^-$, and $S_8^{--}$; and
 (c) an inert, porous cathodic collector consisting of carbon or graphite or of compressed carbon or graphite powder.

2. A cell according to claim 1, wherein said liquid solution further comprises an organic aprotic solvent which is chemically inert to the anode, the cathode and the electrolyte and is liquid at temperatures between about −50° C. and about 100° C.

3. A cell according to claim 2, wherein said solvent is selected from tetrahydrofuran and γ-butyrolactone.

4. A cell according to claim 1, wherein said liquid solution further comprises at least one additional electrolyte being a salt of an alkali metal or an alkaline earth metal, the EMF of which is higher than the EMF of said anode less 0.5 volts.

5. A cell according to claim 1, wherein the anode consists of an alkali metal.

6. A cell according to claim 5, wherein the alkali metal is lithium.

7. A cell according to claim 1, wherein the anode consists of an alkali metal containing from 5 to 15 percent by weight of calcium or magnesium, alloyed therewith.

8. A cell according to claim 1, wherein the cathode is selected from the group consisting of Freon F 113; 1,1,1-trichloroethane; 1,2-dichloroethane, 1,2-difluoropropane; and 1,2-dibromoethane 9. A cell according to claim 1, wherein the cathode is propylene glycol-1,2-sulphite.

10. A cell according to claim 1, wherein said inert, porous cathodic collector is of compressed carbon or graphite powder with a suitable binder.

11. A cell according to claim 4, wherein said liquid solution further comprises an organic aprotic solvent which is chemically inert to the anode, the cathode and all the electrolytes present and is liquid at temperatures between about −50° C. and about 100° C.

* * * * *